Aug. 13, 1940.  S. J. DAVEY ET AL  2,211,367
VENTILATOR
Filed Nov. 14, 1936   2 Sheets-Sheet 1
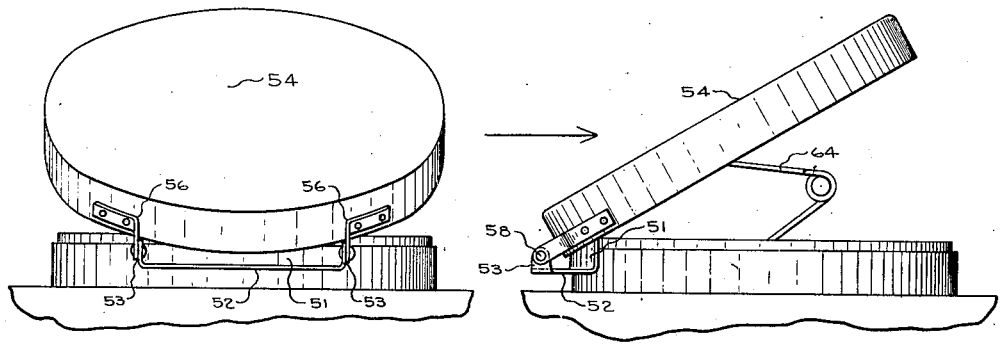
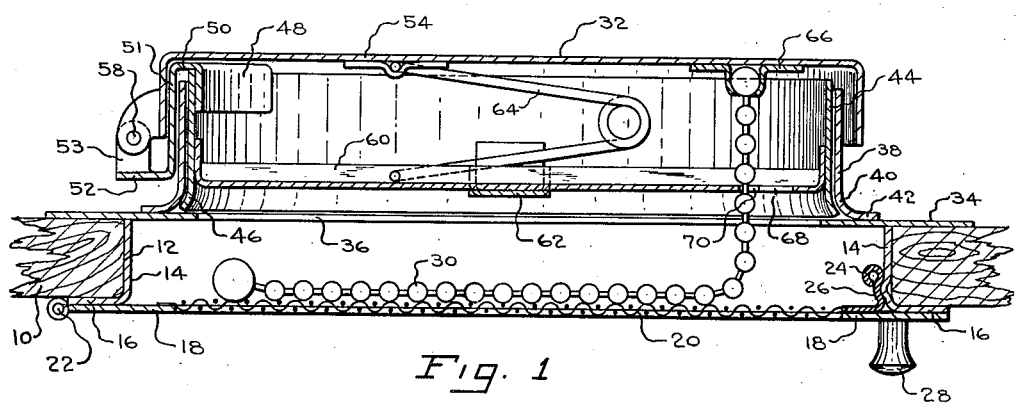
Inventors
SAMUEL J. DAVEY AND
GLENN A. CHRISTMAN
By Beaman & Langford
Attorney Aug. 13, 1940.  S. J. DAVEY ET AL  2,211,367
VENTILATOR
Filed Nov. 14, 1936  2 Sheets-Sheet 2

Inventors
SAMUEL J. DAVEY
AND
GLENN A. CHRISTMAN

By Beaman & Langford
Attorney

Patented Aug. 13, 1940

2,211,367

UNITED STATES PATENT OFFICE 2,211,367

VENTILATOR

Samuel J. Davey and Glenn A. Christman, Jackson, Mich., assignors, by mesne assignments, to Evans Products Company, Detroit, Mich., a corporation of Michigan Application November 14, 1936, Serial No. 110,866

9 Claims. (Cl. 98—8)

This invention relates to improvements in ventilators capable of general use in exteriors, roofs, and the like and being especially designed to be used in the roof of motor vehicles and trailers particularly those used for living quarters.

It is a desired advantage, particularly in house trailers or the like in which the kitchen, living room and sleeping quarters are combined in one and the same space, to be able to exhaust or admit air as necessitated by interior conditions. By the present invention this is made possible by a ventilator preferably located in the roof which may be manually shifted with reference to the direction of the wind to exhaust air through the ventilator from the interior or direct air into the interior. Thus an object of the present invention is to provide a ventilator of the type described which may be shifted at will and positioned relative to the direction of the wind to either exhaust from or admit air to an interior.

Another object of the invention is the provision of an inexpensive roof or wall ventilator which may be installed in an exterior wall or ceiling of a trailer or the like and manually opened and closed and swung from one position to another from within the trailer.

Another object of the invention is to provide a ventilator of the type described which is cheap and durable, which is leakproof against rain or the like when closed, and which contains means to prevent entry of rain from along the roof when open.

Other objects and advantages of the invention reside in the specific construction and arrangement of parts as will more clearly appear from consideration of the detailed description and as set forth in the appended claims.

Figure 4:
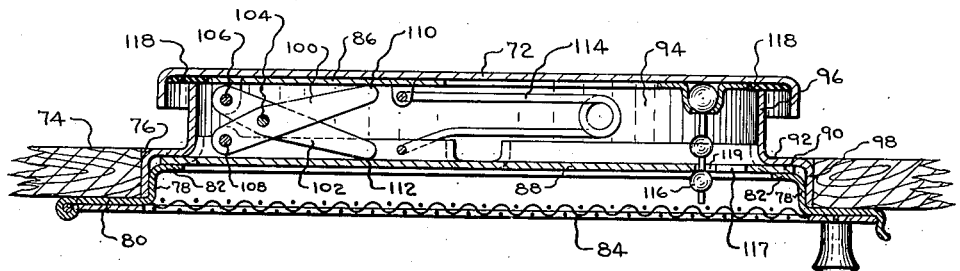
Figure 5:
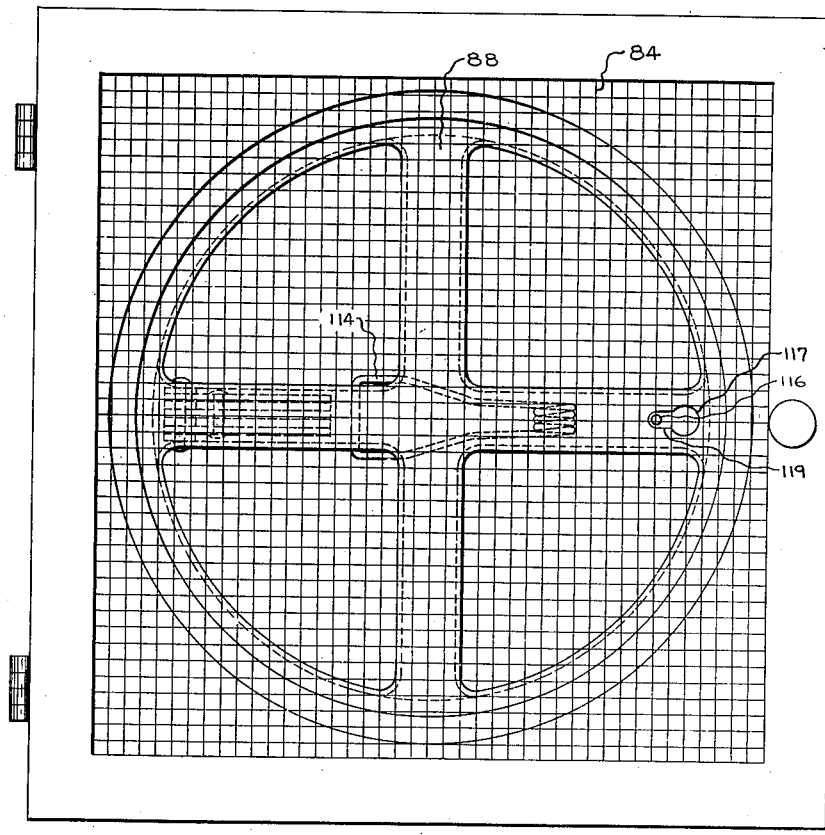
Figure 6:
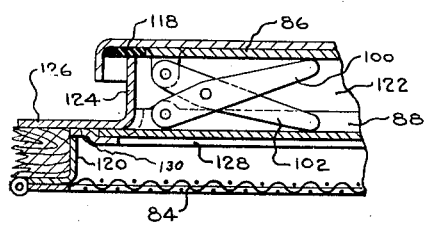

In the accompanying drawings wherein several embodiments of the invention are shown for the purpose of illustration Fig. 1 is a cross-sectional view taken through the ventilator as it will appear installed in the roof of a building, trailer or other exterior, Figs. 2 and 3 are rear and side elevations, respectively, of the ventilator shown in Fig. 1 in open position, Fig. 4 is a view similar to Fig. 1 of another form of the invention, Fig. 5 is a view of the ventilator shown in Fig. 4 as viewed from the under side, and Fig. 6 is a fragmentary cross-sectional view of a further form of the invention.

Referring particularly to Fig. 1 the roof of a house trailer or other structure is designated as at 10 and having a square opening 12 defined therein. A square frame 14 conforming to the opening 12 of the roof has a horizontal flange portion 16 to which is hinged a frame 18 having a central screen portion 20, the frame 18 being hinged to the frame 14 at 22 and being held in position by a spring detent 24 coacting with a bulge portion 26 in frame 14. A knob 28 is provided for opening and closing the screen to provide access to the chain 30 for regulating the opening and closing of the cover of the ventilator.

The ventilator generally designated 32 is preferably of sheet metal construction and comprises a base 34 having an opening 36, the base 34 being secured to the roof 10 in any suitable manner. Fixed to the base 34 and supported therefrom is a circular vertically disposed band 38 which is curvilinearly flared at 40 to provide a lower flange portion 42 fixed to the base 34. Within the band 38 and of slightly less diameter is a band 44 having the lower end flared at 46 so as to interlock beneath the curvilinear flared portion 48 of the band 38. The band 44 is supported for rotary movement within the band 38 with its lower edge resting upon the base 34 so that the portion of base 34 about the opening 36 forms a supporting ledge for the member 44. Connected to the band 44 is a bracket member 48 which has a U-portion 50 straddling the band 38 and a leg portion 51 disposed on the outside of the band 38 and terminating in a horizontal portion 52. The portion 52 at opposite ends is turned up to provide ears 53. A cover 54 is provided with ears 56 for hingedly supporting the same for pivotal movement about pins 58. Cross frame members 60 and 62 are supported within the band 44, the member 60 acting as a support for one end of the spring 64, the other end of which acts against the inside of the cover 54. The spring 64, with the cover closed, is under tension in the position shown in Fig. 1 and is continuously acting to urge the cover 54 to the full open position shown in Fig. 3. One end of the chain 30 is connected to the cover by a socket member 66 and extends through a large opening 68 in the frame 60 in connection with which is provided a narrow slot 70 capable of receiving narrow portions of the chain 30 to hold the cover 54 in either a closed position or in any one of several positions between full closed and full open position.

To manipulate the ventilator 32 the screen is opened by pulling downwardly on the knob 28 and the chain 30 is pulled out of the slot 70 into the enlarged opening 68 and the cover 54 is pushed upwardly by the opening action of the spring 64. If it is desired to exhaust air from an interior the ventilator 32 is manually rotated by gripping the frame members 60 and 62 in the hands and turning the band 44 about its vertical axis within the band 38 until the direction of the wind corresponds to the direction of the arrow as shown in Fig. 3. With the ventilator in the position shown in Fig. 3, with reference to the direction of the wind, the cover 54 will act to direct the air stream to the side and above the central opening of the ventilator with the result that there will be a tendency to create an upward draft through the ventilator all in a well known manner. In the event it is desired to scoop air in through the ventilator into the interior, the ventilator 32 will be rotated until the cover when opened is in such a position with reference to the direction of air flow that it will be deflected by the under side of the cover 54 downwardly. For weather proofing the ventilator 32 any suitable seal (not shown) of rubber or other material may be located between the cover 54 and either the band 38 or 44 or both to provide a seal for the ventilator 32 when in the closed position shown in Fig. 1.

In Fig. 4 is shown a modified form of the invention which is so constructed as to enable the ventilator generally designated 72 to be installed in the roof 74 by being inserted upwardly from the inside into a suitable opening 76. In this case the base construction is indicated at 78 and has horizontal flanges 80 and 82. The flange 80 may be employed as an anchoring structure for fastening the ventilator to the wall 74. The screen 84 is shown hinged from the flange 80 for protecting the opening 76 against the passage of insects when the cover 86 of the ventilator is open. The rotatable frame for the cover 86 is in the form of a stamped ring 88 with a central spider construction and a narrow flat edge portion 90 supported for rotation upon the flange 82, which thus forms a supporting ledge, and held against axial movement by the horizontal web portion 92 of the fixed band 94 having circular vertical portions 96 and 98 of different diameter. In manufacturing the ventilator shown in Fig. 4 the stamped ring 88 is supported upon the flange 82 and then the fixed band 94 is placed in position. The vertical portions 78 and 98 are then welded or otherwise secured to each other at their points of contact. It is to be understood that the edge portion 90 of the ring 88 is freely supported between the flange 82 and the web 92 so as to enable the ring 88 to be rotated in the same manner as the band 44 of the construction shown in Fig. 1.

In lieu of having the supporting hinge for the cover 86 upon the outside as shown in Fig. 1, a scissor type of hinge is shown in Fig. 4 which comprises a pair of arms 100 and 102 which may conveniently be made up from a plurality of similar stampings placed side by side to obtain the thickness for rigidity. The arms 100 and 102 are pivotally connected to one another at 104 and to the cover 86 and ring 88 at the points designated 106 and 108, respectively. It will be noted that the pivot 104 is located nearer one end of the arms 100 and 102 than the other and that the ends of the arms 100 and 102 have sliding engagement with the under side of the cover at 110 and with the ring 88 at 112. The spring 114 corresponds to the spring 64 shown in Fig. 1 and functions in the same manner. Likewise the chain 116 corresponds to the chain 30 and is passed through enlarged opening 117 and through insertion into the narrow slot 119 functions to locate the cover 86 in a closed position or in any one of numerous positions between the full open and full closed, the chain 116 being shown broken. In operation the chain 116 is swung into the opening 117 and the cover released to the action of the spring 114, the scissor pivot consisting of the arms 100 and 102 will function to position the cover 86 in a position corresponding to the position of the cover 54 shown in Fig. 3. With this type of hinge construction when the cover 86 is lowered by pulling down on the chain 116 contact between the arms 100 and 102 with the cover 86 at 110 and the ring 88 at 112 will result in a closing up of the scissors hinge arms 100 and 102 to tightly clamp the cover 86 down against the portion 96. As shown a sealing ring 118 is provided on the under side of the cover 86 and adapted to be brought into stressed engagement with the upper edge of the portion 96.

In Fig. 6 the construction of Fig. 4 is shown slightly modified in that the frame 120 for the screen 84 is separate from the band 122. The band 122 is shown having a vertical circular flange 124 and a horizontal flange 126 which overlaps the opening in the roof and is capable of receiving suitable fastening means for securing the ventilator in position. The ring 88 is supported for rotary movement upon a flange 128 spaced from the flange 126 at its inner edge and integrally attached to the flange 126 as at 130. The inner edge of flange 128 forms a supporting ledge for supporting ring 88.

It is to be understood that while the ventilator cover and associated structure is capable of being manually rotated that sufficient resistance against rotation exists in the structure to prevent the wind, with the cover open as shown in Fig. 3, from influencing the position of the ventilator.

It will readily occur to those skilled in the art that any one of the constructions shown in Figs. 1, 4 and 6, and particularly that shown in Fig. 4, may be arranged to be substantially flush with the top of the roof if it is desired to improve the streamlining of a vehicle upon which the ventilator may be used.

It will be apparent that in all forms of the invention illustrated the fixed member 38, 96, or 124 provides an upright cylindrical flange extending appreciably above the level of the trailer roof and secured and sealed with respect to the roof overlying flat portion 34 (in Fig. 1) or 126 (in Fig. 6). In Fig. 4, web portion 92 is flush with the roof top. This upright cylindrical portion sealed at its base against entry of water prevents the entry of rain, or the like, from along the roof when the cover is open and, of course, is sealed by the cover when it is closed. It also provides a rigid support for the rotatable assembly which carries the cover hinges.

Having thus described our invention what we desire to protect by Letters Patent and claim is:

1. A rotatable and closable exterior ventilator adapted to be associated with a suitable opening in a house trailer roof or the like and comprising an upright cylindrical member extending above, fixed and sealed with respect to the trailer roof and defining a central opening, a band rotatable from the interior of the trailer supported for rotation within said cylindrical member, and a flat topped cover hinged to said rotatable band and overlying said upright cylindrical member to open and close the opening therein and operable from within the trailer.

2. A rotatable and closable exterior ventilator adapted to be associated with a suitable opening in a house trailer roof or the like and comprising an upright cylindrical member extending above, fixed and sealed with respect to the trailer roof, and defining a central opening, a manually rotatable band, means including a ledge inwardly projecting and fixed with respect to said upright cylindrical member for rotatably supporting said manually rotatable band and for holding it against vertical movement, and a flat topped cover hinged to said manually rotatable band and overlying said upright cylindrical member to open and close the opening therein.

3. A rotatable and closable exterior ventilator adapted to be associated with a suitable opening in a house trailer roof and comprising a frame structure fixed on the trailer roof, said frame structure including a flat member adapted to be fixed on the trailer roof and an upright cylindrical collar fixed and sealed to said flat member and defining a central opening therein, a manually rotatable structure including a spider mounted for rotation and held against vertical movement in said upright collar, a relatively flat topped cover hinged adjacent its periphery upon said spider for pivotal opening or closing movements, said cover overlying said upright collar when in a closed position, manually operable means connected to said cover and to said spider for moving or maintaining said cover in open or closed position, said cover when opened acting to either cause an upward draft through said central opening or to deflect air currents therethrough depending upon the direction of air flow with reference to said cover.

4. An exterior roof ventilator for house trailers and the like for either directing air into the interior or exhausting air therefrom, depending upon the rotated position of the ventilator cover, said ventilator comprising a fixed upright cylindrical collar extending above the trailer roof, a rotatable structure supported within said circular collar and accessible from within the trailer, a flat cover overlying said cylindrical collar for providing a weather seal for the opening in the roof defined within said collar, and a hinge structure for said cover carried by said rotatable structure whereby said cover may be rotated about its axis and swung upon the hinge structure for opening and closing from within the trailer.

5. An exterior roof ventilator for house trailers and the like for either directing air into the interior or exhausting air therefrom depending upon the rotated position of the ventilator cover, said ventilator comprising a fixed upright cylindrical collar, a rotatable structure supported and held against vertical movements within said collar and manually rotatable from within the interior, a relatively flat circular cover having turned down edges overlying said collar adapted in its closed position to overlie and weather proof the roof opening within said collar, means for pivotally supporting said cover adjacent its periphery for opening or closing movements, said means being supported from said rotatable structure whereby said means and said cover are rotatable therewith as a unit, means for regulating the pivotal position of said cover, the upper and under sides of said cover functioning to direct air currents downwardly through the roof opening or past the roof opening.

6. An outside ventilator structure for the roofs of house trailers or the like having a suitable opening for ventilating the interior through the ingress or egress of air currents through the ventilator, said structure comprising an adjustable air deflector in the form of a relatively flat cover, a fixed structure adapted to outline said suitable opening in the trailer roof, a hinge structure for said cover for supporting the same adjacent its periphery for pivotal opening or closing movements, said cover in closed position overlying said fixed structure and being rotatable relatively thereto, and rotatable supporting means for said hinge structure and said cover supported and held against vertical movements in said fixed structure and manually rotatable relative thereto from the under side of said cover from the trailer interior through the roof opening, and manually adjustable means for maintaining said cover substantially parallel to said roof or in a plurality of relatively tilted positions, said manually adjustable means being accessible through the roof opening from within the trailer.

7. An outside ventilator structure adapted to be supported above and overlying the edges of an opening in a roof structure of house trailers and the like, said structure comprising a fixed base for overlapping the opening and having a central opening therethrough, an upright collar positioned above and sealed to said base and surrounding said opening, a curved over cover having a downwardly extending flanged edge overlying said collar, said flanged edge being in overlapping relation with the upper edge of said collar with said cover in closed position to weather proof the same, a hinge structure for supporting said cover adjacent its periphery for pivotal opening of closing movements, means for supporting said hinge and said cover as a unit for rotation relative to said collar, and means for adjusting and maintaining said cover in closed position for sealing said opening or in angular adjusted position for directing air currents through said opening, said means being rotatable as a unit with said cover and said hinge supporting structure within said upright collar and being accessible from within the trailer.

8. A closable and rotatably adjustable ventilator adapted to be secured on the exterior of a house trailer roof or the like associated with a suitable opening therethrough, said ventilator comprising a flat plate adapted to be fixedly secured on and substantially flush with the trailer roof, said plate having a circular opening therein disposed over said trailer roof opening, an upstanding cylindrical collar fixed and sealed to said plate and extending an appreciable distance above the said plate and the trailer roof to prevent entrance of rain, a frame including a circular band mounted for rotation but held against vertical movement in said upright collar, hinge means carried by said rotatable frame, a circular flat topped cover connected to said hinge means adjacent the periphery of said cover and having its edges curving over into a downwardly extending peripheral flange overlying said collar to form a weather seal, and means mounted between said cover and said rotatable frame for moving and holding said cover in the adjusted position by its hinge means.

9. A rotatable and closable exterior ventilator adapted to be associated with a suitable opening in a house trailer roof or the like, comprising an upright cylindrical member extending above, fixed and sealed with respect to the trailer roof opening to define an opening, a band manually rotatable from the interior of the trailer, means including a ledge fixed with respect to said upright cylindrical member for rotatably supporting said band and for holding it against vertical movement, and a flat-topped cover hingedly connected to said band and overlying said cylindrical member to open and close the opening therein.

SAMUEL J. DAVEY.
GLENN A. CHRISTMAN.